M. M. MILLS.
HORSESHOE PAD.
APPLICATION FILED MAR. 31, 1908.

916,750. Patented Mar. 30, 1909.

WITNESSES:
G. V. Rasmussen
John A. Kehlenbeck

INVENTOR
MADELEINE M. MILLS
BY
Bresee T. Vmants
ATTORNEYS

UNITED STATES PATENT OFFICE.

MADELEINE M. MILLS, OF NEW YORK, N. Y.

HORSESHOE-PAD.

No. 916,750.　　　Specification of Letters Patent.　　Patented March 30, 1909.

Application filed March 31, 1908. Serial No. 424,355.

*To all whom it may concern:*

Be it known that I, MADELEINE MERLI MILLS, a citizen of the United States, and resident of Kingsbridge, borough of the Bronx, city, county, and State of New York, have invented certain new and useful Improvements in Horseshoe-Pads, of which the following is a specification.

My invention relates to horse-shoe pads and has for its object to provide a pad which will afford a permanently efficient hold so as to prevent slipping and another object of my invention is to insure ventilation to the hoof when desired.

Figure 1:
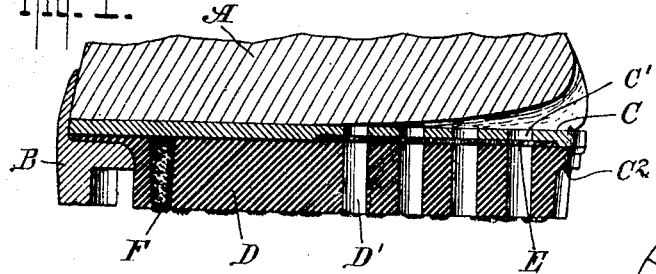
Figure 5:
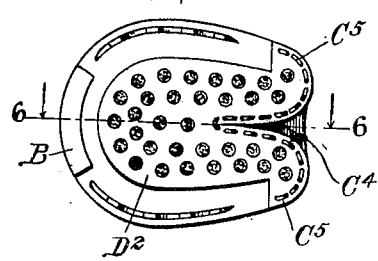
Figure 2:
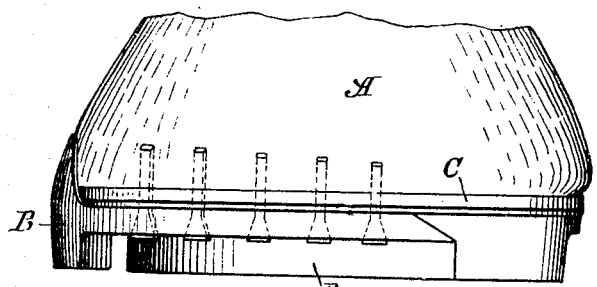
Figure 3:
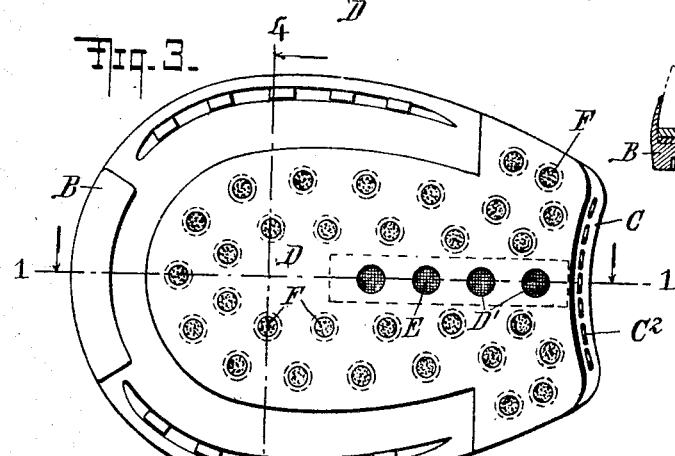
Figure 6:
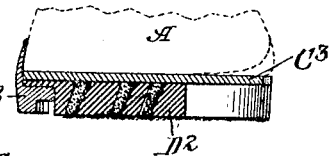
Figure 4:
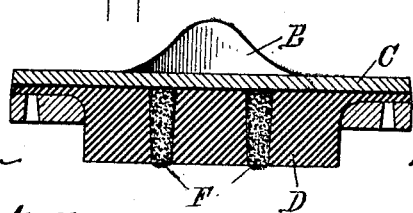

In the accompanying drawings Figure 1 is a longitudinal section showing a horse's hoof with my improved pad applied thereto; Fig. 2 is a side elevation. Fig. 3 is a bottom view of the improved pad in connection with a horse-shoe. Fig. 4 is a vertical section on line 4—4 of Fig. 1. Fig. 5 is a bottom view showing another form of my invention. Fig. 6 is a vertical section on line 6—6 of Fig. 5.

A indicates the horse's hoof and B the horse-shoe, which may be of any style adapted for use in connection with pads.

The pad proper comprises an upper layer C made of leather, canvas, or other suitable material and adapted to be placed against the horse's hoof. The tread portion D of the pad is formed of rubber or an equivalent composition and is provided with a number of recesses or openings D' leading upward from the bottom face of said tread portion. Some of these openings have been shown as holes registering with perforations C' in the upper layer C and preferably a layer of felt or other suitable material E is interposed between the two members of the pad at the points where such openings lead through it in order that, while allowing for ventilation, the passage of mud or grit to the hoof may be prevented. If desired, all of the openings through the pad might be of this character and in this case the grip or hold of the pad on the pavement is secured by a sort of suction or adhesion, slipping being absolutely prevented. The drawing shows that the majority of the openings D' are filled with a gritty mixture F, which originally projects slightly below the bottom surface or tread surface. This mixture consists of silicate of soda, or other suitable binder, together with a gritty material, such as sand carborundum or corundum in granular form or powdered and in some cases I admix fibrous asbestos to increase the tenacity of the mass. Such a gritty mixture will always remain rough, even after considerable use, that is, it will not wear smooth and will therefore insure an absolutely secure foothold for the horses. I prefer to have these openings which contain the gritty mixture F, tapered or contracted toward the bottom of the pad so as to guard against their slipping out of their sockets or recesses. The openings containing such gritty mixture are preferably extended only through the tread portion D, the upper layer C forming a cover for said openings. When first made the points formed by the gritty mixture project slightly from the tread surface.

The connection of the upper layer C and the tread portion D may be effected in any suitable way, for instance by stitching along the periphery as indicated at $C^2$. It will be understood that all the holes might be filled with the gritty mixture above referred to, or all of them might be left vacant, in which latter case only the suction effect would be relied upon to prevent slipping, or both effects might be combined by filling some of the holes and leaving others empty, as shown in Figs. 1 and 3.

In Figs. 5 and 6 I have shown a slightly different construction in which all the holes of the tread portion $D^2$ are filled with a gritty mixture and preferably these holes are not only tapered toward their lower ends, but also inclined as shown in Fig. 6. The upper layer $C^3$ of the pad is slightly different in shape from that shown in Fig. 3 having a cut or fissure $C^4$ at the rear end or heel to secure a better fit and greater elasticity. The line of stitching $C^5$ follows the outline of the upper layer $C^3$.

Instead of sewing the two portions of the pad together, they might be welded or connected in any other way. The cellular structure obtained by the vacant holes and the suction effect resulting therefrom may be employed in connection with any foot-wear for horses and the same thing is true of the gritty mixture applied to roughen the tread surface.

I claim as my invention;

1. A horse-shoe pad comprising an upper layer, an elastic tread portion secured to said layer and provided with ventilating perforations, and a barrier, pervious to air, closing said perforations.

2. A horse-shoe pad comprising a perforated upper layer, a tread portion perforated in registry with said upper layer, and a barrier pervious to air interposed between said two elements at their perforations.

In testimony whereof I have hereunto set my hand in the presence of two subscribing witnesses this 19th day of March, 1908.

MADELEINE $\overset{\text{her}}{\times}$ M. MILLS.
$\text{mark}$

Witnesses:
 STELLA MILLS,
 JOHN A. KEHLENBECK.